United States Patent [19]

Peavey et al.

[11] Patent Number: 5,426,438
[45] Date of Patent: Jun. 20, 1995

[54] METHOD AND APPARATUS FOR ADAPTIVELY DETERMINING THE BEARING ANGLE OF A RADIO FREQUENCY SIGNAL

[75] Inventors: David L. Peavey, Fremont; Katherine A. Tieszen, Cupertino; Timothy D. Stephens, Milpitas; Fred E. Schader, San Jose; Nicholas Cianos, Menlo Park; John R. Conkle, Los Gatos, all of Calif.

[73] Assignee: Delfin Systems, Santa Clara, Calif.

[21] Appl. No.: 998,391

[22] Filed: Dec. 30, 1992

[51] Int. Cl.$^6$ .............................................. G01S 5/04
[52] U.S. Cl. ..................................... 342/433; 342/432
[58] Field of Search ............... 342/432, 433, 434, 435, 342/436, 437

[56] References Cited

U.S. PATENT DOCUMENTS 5,010,343  4/1991  Andersson ........................... 342/432
5,323,167  6/1994  Peavey et al. ....................... 342/429

*Primary Examiner*—Theodore M. Blum
*Attorney, Agent, or Firm*—Joseph A. Sawyer, Jr.; Judy M. Maher

[57] ABSTRACT

A system and method for obtaining the bearing angle of radio frequency is utilized in a direction finding system to determine the signal of interest. The system utilized an adaptive interferometric processor to null out modulation occurring due to commutation between the antenna elements. Through this system the bearing angle can be determined accurately and efficiently.

18 Claims, 8 Drawing Sheets

METHOD AND APPARATUS FOR ADAPTIVELY DETERMINING THE BEARING ANGLE OF A RADIO FREQUENCY SIGNAL

FIELD OF THE INVENTION

This invention relates to finding the direction of a radio frequency signal and more particularly to determining the bearing angles of such signals.

BACKGROUND OF THE INVENTION

The direction finding systems of today owe much to concepts related to radio direction finding learned over the first half of this century. However, over the past two decades, relatively inexpensively analog and digital processing tools have led to the development of high performance, easy to use, direction finding devices that are viable for many applications.

While these new tools are derived from advances in commercial digital signal processing (DSP), there are technologies unique to direction finding (DF) systems that are of significant importance to such systems. The design of a complete DF system requires careful consideration of many factors ranging from frequency, propagation, and modulation to application and deployment. However, the most important direction finding fundamental is the method used to intercept and locate signals of interest (SOI).

As with any radio frequency signal intercepting system, the receivers and detectors are optimized for the particular signals of interest. In such systems certain design performance requirements such as size, weight and power are balanced against the key systems specifications: selectivity and sensitivity. One of the most critical parameters to be influenced by DSP functions are the computation of the bearing angle of the signal. The present patent application is directed towards influencing the computation of bearing angles. DSP plays a major role in improvement of the signal to noise ratio and computation of the quality factors, an indication of the effectiveness of the bearing measurement. Processing also considers calibration issues. Specifically, various antenna and equipment calibration methods use DSP to achieve and maintain the desired measurement accuracies on the order of a few degrees of true compass headings.

Finally, the DF system processor provides the man-machine interface. With new digital display technology, many additional capabilities have been added to the design of today's direction finding systems.

The functional features of the system include intercept search speed and operational performance as well as adaptability of the equipment to multiple applications. There are many types of advanced processing procedures and functions associated with DSP systems. In addition, these performance characteristics improve the direction finding systems.

However, the performance of even the latest direction finding systems is ultimately affected by the law of physics. The chance location of the direction finding (DF) equipment at a field site or on a platform may result in significant measurement errors. In some cases the deleterious effects of the site or platform can be mitigated either by moving the location or calibrating the error into the calculation.

In antenna array sampling techniques, various methods are used to achieve affordable multi-application system designs. These sampling methods determine the bearing angle of the radio signal so that the proper signal can be found.

Antenna array sampling methods, like those used in current pseudo-Doppler DF, are an attractive way of achieving affordable multi-application system designs. When combined with the latest signal processing methods and low-cost processors, array sampling techniques offer benefits that are comparable to earlier, very expensive system approaches.

DF antennas have aperture dimensions that are typically small, most less than half a wavelength. Today's electromagnetic modeling and computer-aided design tools allow engineers to design antennas that are relatively small and efficient over wide spectral bands. But the small aperture size of the antennas would make turning or steering techniques an ineffective means to locate the arriving signal bearing. Instead, three fundamental measurement parameters are used; amplitude, phase and Doppler frequency.

In the amplitude measurements, two sets of antennas with dipole-type patterns are arranged orthogonally. Signals arriving at the two antennas induce a voltage relative to the polarization and radiation pattern for each antenna. The bearing angle is derived from the ratio of the two signal amplitudes. Because simple amplitude measurements are made, a sense antenna (with an omni-directional pattern) is used to resolve the "180 degree" ambiguity in the bearing calculation.

Direct phase measurement methods for example, use a set of four antennas. Two antennas form one baseline. The relative phase differences of the induced voltages between the antennas define the bearing angles. Ambiguity in the bearing measurements, therefore, is not an issue.

Conceptually, at least, the Doppler measurement methods are straightforward. An antenna is rotated about a point at a given angular rate. An the antenna moves, it imposes a Doppler shift on the arriving signal. The magnitude of the Doppler shift is at a maximum as the antenna moves directly toward and away from the direction of the incoming wavefront. There is no apparent frequency shift when the antenna moves orthogonally to the wavefront. The bearing angle is therefore proportional to the relative position of the zero crossings of the Doppler-shifted signal. For many applications Doppler methods are not practical, since the system uses motors and moving components.

Although the amplitude and phase measurement methods are viable DF approaches, they too have some significant constraints. First, they must maintain amplitude and phase balance to minimize measurement errors. Maintaining amplitude and phase balance is especially challenging when the antennas are connected to the processor through the multiple amplitude-phase matched receivers and cable assemblies still used in older system architectures. The antennas and receivers are significantly more expensive as well. Add these factors to the complexity of the overall DF system design and the antenna array continues to be the major focus for new design challenges.

Computer and RF technology advances over the past 20 years have resulted in new tools and devices to create systems with a single receiver. Using one receiver in a system reduces the balancing errors, overcomes the complexities of amplitude-phase matched receivers and substantially reduces system cost. Hence, the system becomes more affordable.

There are various ways of designing a DF system with a single receiver, such as the RF combining subsystem approach. In this design, RF processing elements combine the outputs of the antenna elements and feed the combined RF output signal to a single receiver and DF processor.

An alternative approach uses RF sampling methods from an array of antennas. Here, an RF sampling (or commutating) switch samples each antenna and sends the combined samples to the receiver and DF processor. This sampling method simplifies the design of the antenna electronics and further reduces design complexity.

This approach is more affordable because of low-cost RF switching technology. In general, the array sampling techniques are also less expensive to implement than the RF combining methods. As the commutating switch samples the elements of the array, the commutation modulates the signal going to the receiver. The modulation arises from the phase differences between the antenna elements as the switch moves from one antenna to the next. The relative phase differences are related directly to the bearing angle.

Effectively, the known sampling process can be viewed from the perspective of the commutating switch electronically rotating the antenna and hence imposing a "Doppler spectral line" on the received signal. The spectral line is detected and processed to derive the bearing angle. This is the basis of pseudo-Doppler DF systems. Pseudo-Doppler DF systems are very good at determining bearing angles, however, they have three disadvantages.

First, they have a significant audio feed-through signal that results from modulation created by the commutator switch. This commutation modulation can affect the accuracy of the measurement. A second problem with the pseudo-Doppler technique is that there is feed-through on signal sideband signals and therefore the intelligence on the signal cannot be detected while the system is deriving the bearing angles. Finally, the third problem associated with these techniques is that for adjacent channels the sideband to one signal can move into the adjacent channel and cause interference.

The present invention overcomes the above-mentioned problems.

SUMMARY OF THE INVENTION

An apparatus for determining the signal of interest is disclosed. The apparatus adaptively determines the bearing angle of the signal of interest.

An apparatus for determining the bearing angle of a radio frequency (RF) signal comprises means for commutating between a plurality of RF signal receiving antenna elements to provide a sampled RF signal, the commutating means providing induced phase and amplitude modulation to the RF signal. The apparatus further includes means for modulating the sampled RF signal to an intermediate frequency (IF) signal including modulation from sampling and means for detecting the IF signal. The apparatus also includes means for detecting the IF signal. Finally, the apparatus includes means responsive to the detecting means for removing the induced phase and amplitude modulation from the IF signal whereby the bearing angle of the RF signal is determined.

Through this apparatus the problems associated with prior art systems for determining the bearing angle have been overcome and an optimum determination of the location of an RF signal is obtained.

DETAILED DESCRIPTION OF THE INVENTION

The present invention relates to an improvement in determining the bearing angle in the radio direction finding systems. The following description is presented to enable one of ordinary skill in the art to make and use the invention as provided in the context of a particular application and its requirements. Various modifications to the preferred embodiment will be readily apparent to those skilled in the art and the generic principles defined herein may be applied to other embodiments. Thus, the present invention is not intended to be limited to the embodiments shown but is to be accorded the widest scope consistent with the principles and novel features disclosed herein.

Figure 1:
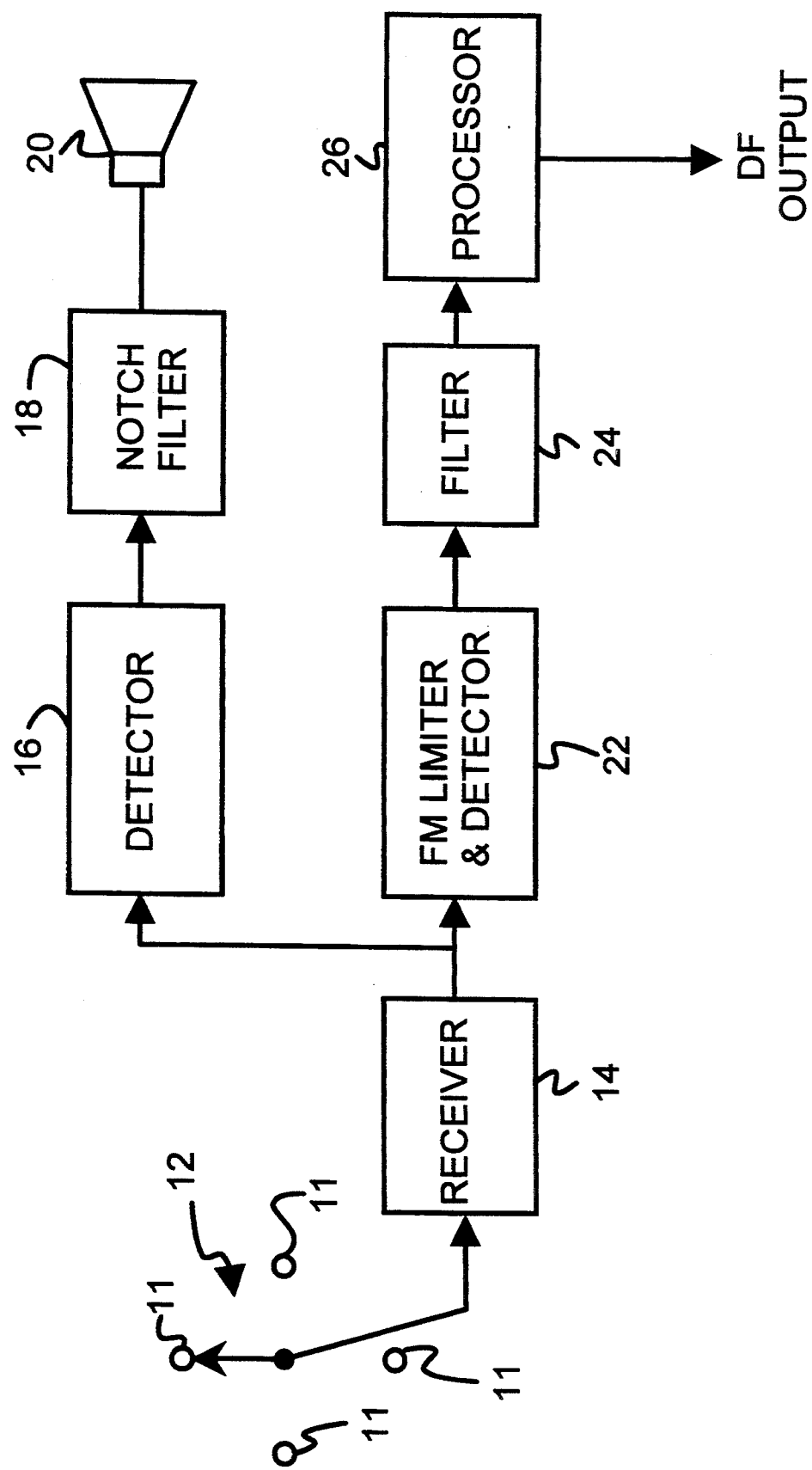
FIG. 1 is a block diagram of the prior art of a pseudo-Doppler receiver system in accordance with the prior art.

FIG. 1 shows the basic elements of a pseudo-Doppler DF system 10. The pseudo-Doppler DF system 10 includes an array of antennas 11 which are sampled by commutating switch 12. The commutating switch 12 is coupled to a receiver 14. The receiver 14 provides its output signal as a sampled IF signal to detector 16 and FM limiter and detector 22. The signal from detector 16 is provided to a notch filter 18 and thereafter to the audio output 20. The FM limiter and detector 22 is provided to narrow band filter 24. Thereafter the output signal from filter 24 is provided to a processor 26. The processor 26 then provides the direction finding output of the bearing angle. The pseudo-Doppler DF system operates in the following manner. The commutating switch 12 imposes a phase modulation component on the received signal. The modulation appears as spectral lines at the switch commutation rate. When the signal passes through an FM discriminator 22, the detected output is a set of band-limited impulses appearing at the commutation rate. The impulses occur when the commutating switch 12 moves from one antenna 11 to the next and the relative phase of the signal at output of the switch changes. The amplitude of the impulse associated with each antenna 11 varies directly with the phase change between antennas 11 and varies directly with the bearing angle.

When the sequence of detected impulses passes through a very narrow-band filter centered at the commutation rate, the filter output is a sine wave. The relative phase of the sine wave defines the bearing angle which is computed in the DF processor.

Although this system 10 operates effectively in many applications it has three major disadvantages. Firstly, the system 10 has a significant audio feed-through signal that is imposed by commutating switch 12 which significantly affects the coherency of the audio signal from speaker 20. This feed-through signal limits the detection of the intelligence of the intercepted RF signal. There is also a significant possibility that the RF signal uses single sideband or amplitude modulation and in which case the detection of intelligence on the signal of interest is not possible while the system 10 is deriving the bearing angles.

Secondly, DF system 10 does not derive the bearing angle in an optimum manner since it is derived from the sine wave of the narrowband filter 24 output. The characteristics (amplitude and phase) of the narrowband filter 21 vary and cause distortion which impacts the bearing measurements.

Thirdly, the commutating switch 12 imposes a modulation on every received signal illuminating the antenna. This modulation creates sidebands in adjacent channels that move into the channel of the signal of interest and cause interference.

Figure 2:
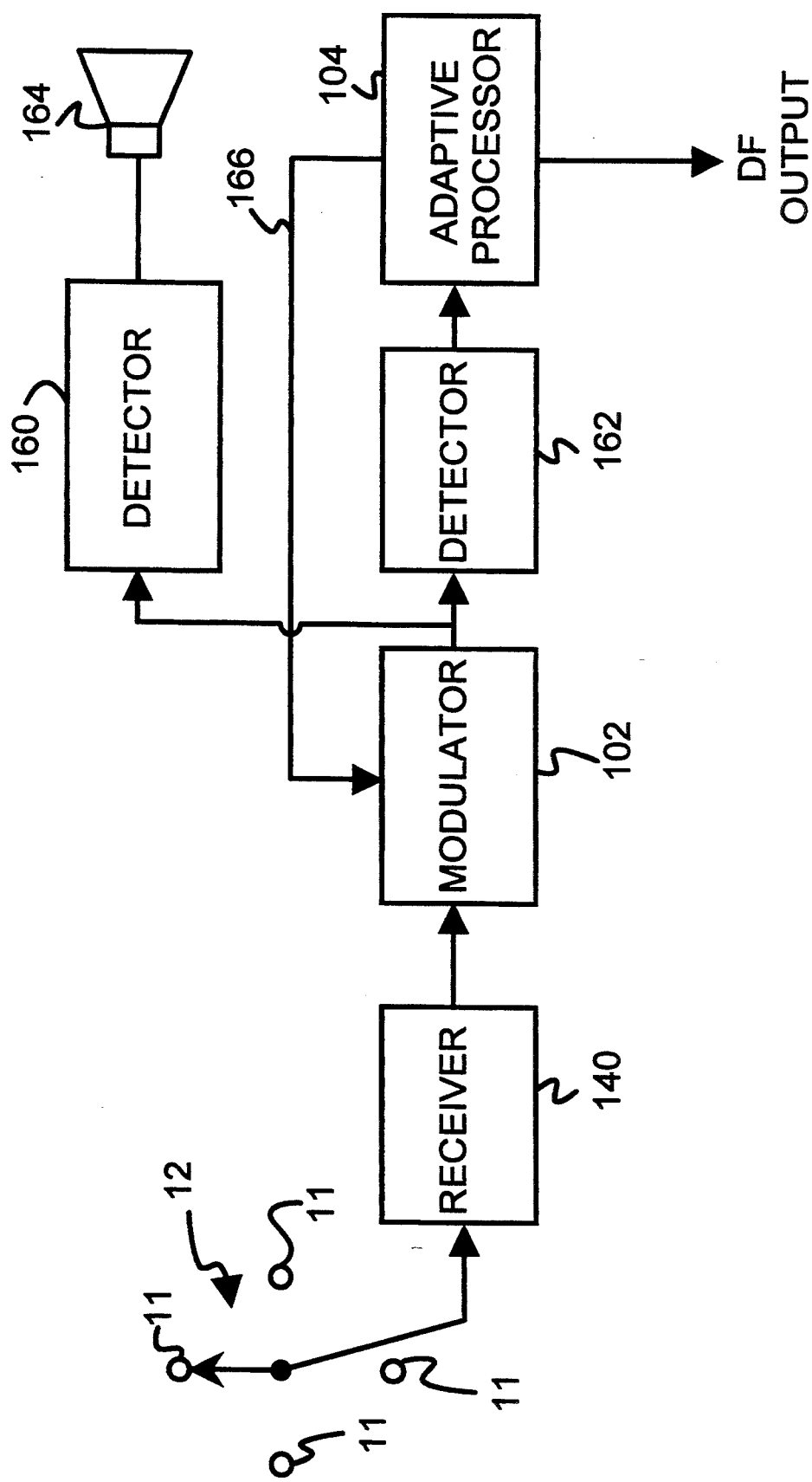
FIG. 2 of a simplified block diagram of the present invention.

The present invention addresses the problems through the use for an adaptive interferometric processor (AIP) DF system. Referring now to FIG. 2, what is shown in simplified block diagram form is AIP DF system 100. The AIP DF system 100 includes an array of antennas 110 which are sampled by commutating switch 120. The commutating switch is coupled to a receiver 140. The switch 120 provides undesirable modulation on the signal. The signal from receiver 140 is provided as a sampled IF signal to modulator 102. The output of modulator 102 is provided to detectors 160 and 162. The output of detector 160 is provided to audio speaker 164 and the output of detector 162 is provided to adaptive processor 104. The adaptive processor 104 is in feedback relationship with modulator 102.

In the AIP DF system of FIG. 2, the commutated signal from the antenna 110 through the receiver 140 is converted to an intermediate frequency (IF). The signal then goes to the input end of the modulator 102. The detector 162 detects the output of the modulator 102 and generates an error signal due to the undesirable induced phase and amplitude modulation from the switch 120 that is used in a feedback loop 166. An adaptive processor 104 within the feedback loop 166 generates a modulation signal that is equal to and out of phase with the undesirable modulation created by the switch 120. Effectively, the feedback loop 166 nulls out the modulation. Since the adaptive processor 104 generates a modulation signal that is equal to but opposite in phase to the switch modulation, the processor 104 effectively computes the bearing angle to provide the DF output.

A system using the adaptive interferometric processor 104 is slightly more complex than a pseudo-Doppler system 10 shown in FIG. 1. However, it has three highly desirable features. First, the AIP system 100 significantly reduces the audio feed-through signal from the commutation switch 120. Since the AIP system 100 nulls out the imposed switch signal, the signal following the AIP system 100 can be used to detect the intelligence on the intercepted signal. The AIP system 100 suppresses the feed through on single sideband signals, and consequently the intelligence on the signal can be detected while the system is deriving the bearing angles.

Secondly, the AIP system 100 nulls the switching signal in a nearly optimal manner. Thus, the bearing computation is nearly optimum. Finally, it is noted that the commutating switch 120 imposes modulation on the received signal. It actually imposes that modulation on every signal that illuminates the antenna 110. The modulation creates sidebands. For adjacent channels, the sidebands of one signal can move into the adjacent channel and cause interference.

The AIP system 100 is sufficiently robust to null the phase modulation on the signal of interest and reduces the effects of the modulation on the adjacent channel signals within the IF passband. Thus, the interfering effects do not corrupt the bearing angle calculation.

Figure 3:
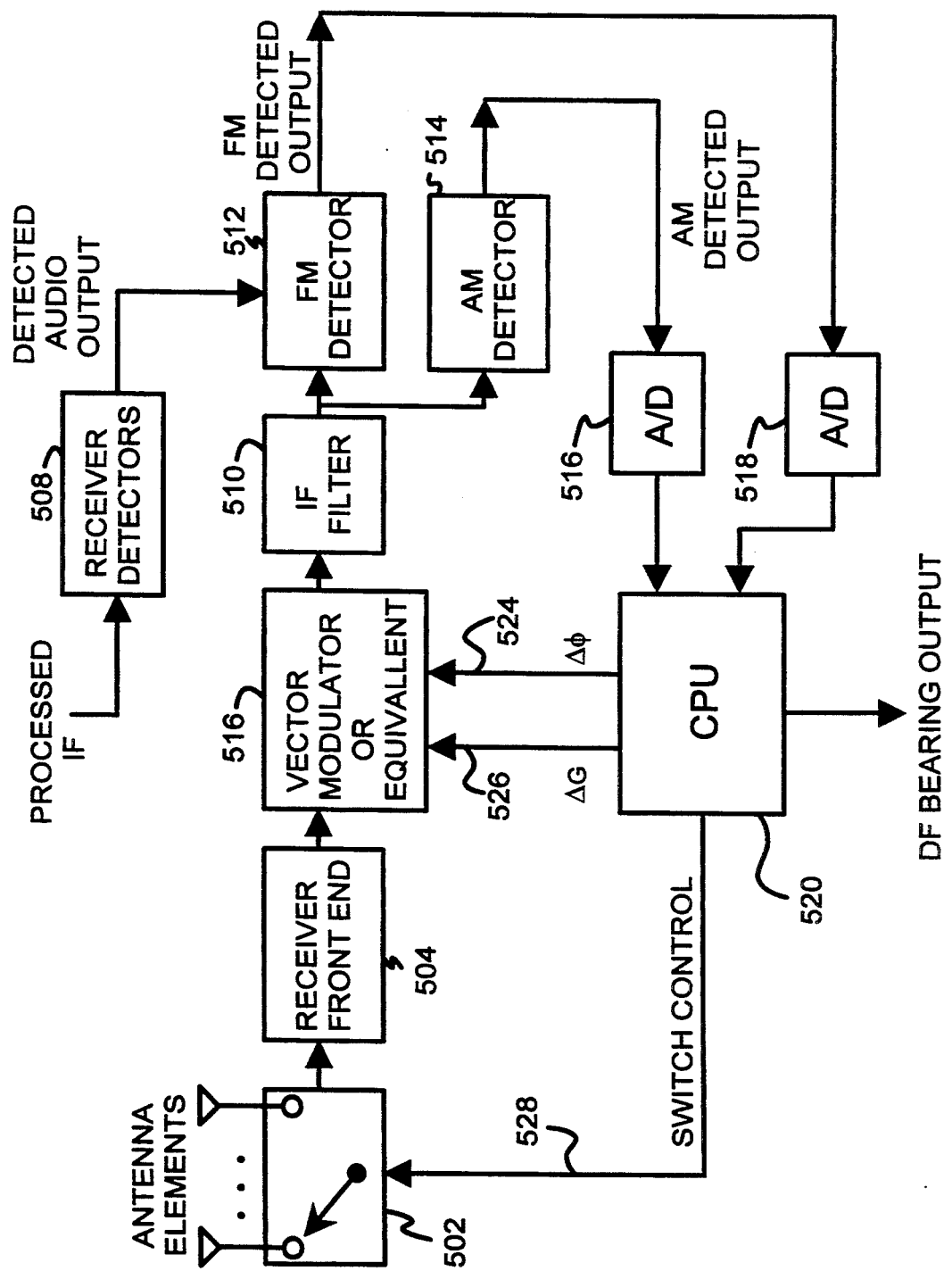
FIG. 3 is a detailed block diagram of an adaptive interferometric processor system in accordance with the present invention.

FIG. 3 is a detailed block diagram of an AIP DF system 500 in accordance with the present invention. DF system 500 includes an array of antenna elements 501 and a sampling switch 502. The switch 502 output is coupled to a receiver front end 504 and provides a sampled RF signal thereto. The output of receiver front end 504 is a sampled IF signal. This output signal is provided to a vector modulator 506. The output of the vector modulator 506 (a processed IF signal) is provided to receiver detector 508 and IF filter 510. The signal from the IF filter 510 is provided to frequency modulation (FM) detector 510 and amplitude modulation (AM) detector 514. The output of receiver/detector 508 is provided to an audio detector or speaker (not shown).

The output of the FM detector 512 is provided to the input of analog to digital (A/D) converter 518. The output of the AM detector 514 is provided to A/D converter 516. The outputs of A/D converters 516 and 518 are provided to central processing unit (CPU) 520. The CPU 520 provides signals via lines 526 and 528 to the vector modulator 506. The CPU also controls switch 502 via line 522.

The DF system 500 operates in the following manner.

The commutating or RF sampling switch 502 samples the antenna elements 501 of the DF array. A switch control line 522 provides the control signal from the CPU 520 to the sampling switch. The CPU 520 can select the antenna elements 501 in any prescribed manner.

The output of the commutating switch 502 is an RF sampled signal. The sampled signal goes to the receiver 502 input. The receiver 502 converts the radio frequency signal to an intermediate frequency (IF).

The original sampled RF signal now appears as a sampled IF signal. The sampled IF signal is provided to the vector modulator 506. The vector modulator 506 adjusts the amplitude and phase of the IF sampled signals. The amplitude and phase adjustments ($\Delta G$ and $\phi e$) are determined by an adaptive interferometric process.

The sampling process imposes a commutation induced phase and amplitude modulation on the RF signal. This modulation correspondingly appears on the IF signal. The amplitude and phase adjustments are selected by the CPU 520 to suppress or null out the effects of the switch induced modulation. Hence, the output of the vector modulator 506 is nearly identical to the original signal without the switch induced modulation components.

The nulled or processed IF signal is provided to two portions of the system 500. The one output is provided to the receiver 508 where the signal is detected with standard detectors. The detected output provides the audio signal that an equipment operator can listen to. It should be noted that the sampled detected IF signal is not very intelligible while the processed IF signal is intelligible.

The second output of the vector modulator 506 is provided through a feedback loop that is part of the adaptive processing element of the system 100. The elements of the feedback loop include an IF filter 510, FM detector 512, AM detector 514, A/D convertors 516 and 518 and the CPU 520 processor.

The IF filter 510 bandwidth is comparable to the bandwidth of the filter(s) (not shown) within the receiver detector 508. The IF filter 510 output is provided to two detectors, AM detector 514 and an FM detector 512. The AM detector 514 measures the amplitude changes of signal and the FM detector 512 measures frequency and hence the phase of the signal.

It should be noted that the FM detector 512 provides the phase change measurement due to the relationship of frequency and phase of a signal. In fact, however, FM detector 512 is measuring frequency. In so doing, phase comparisons that are traditionally used in prior art techniques, are not needed.

For example, it is known that one way to perform phase measurements is to use a phase meter. In this type of arrangement, a reference signal is provided that is compared to the phase of the signal of interest. In the present invention, a change in phase is measured, thereby greatly simplifying the measurements. Within the feedback loop, those detected outputs provide the error signals that are used within the Adaptive Interferometric Process (AIP). The specific signals measured are the induced modulation components from the commutating switch 502.

Both the AM and FM outputs are analog signals. The analog signals are then converted into digital signals with the use of analog-to-digital converters 516 and 518, respectively. From the digital signals CPU 520 in conjunction with internal algorithms, generates amplitude or gain and phase adjustments, $\Delta G$ and $\Delta \phi$. As noted before, those adjustments are provided to the vector modulator 506. The CPU 520 is typically a general purpose computer used to control and operate the system. After the CPU computes $\Delta G$ and $\Delta \phi$, it then computes the DF bearing angle of the signal of interest.

Figure 4:
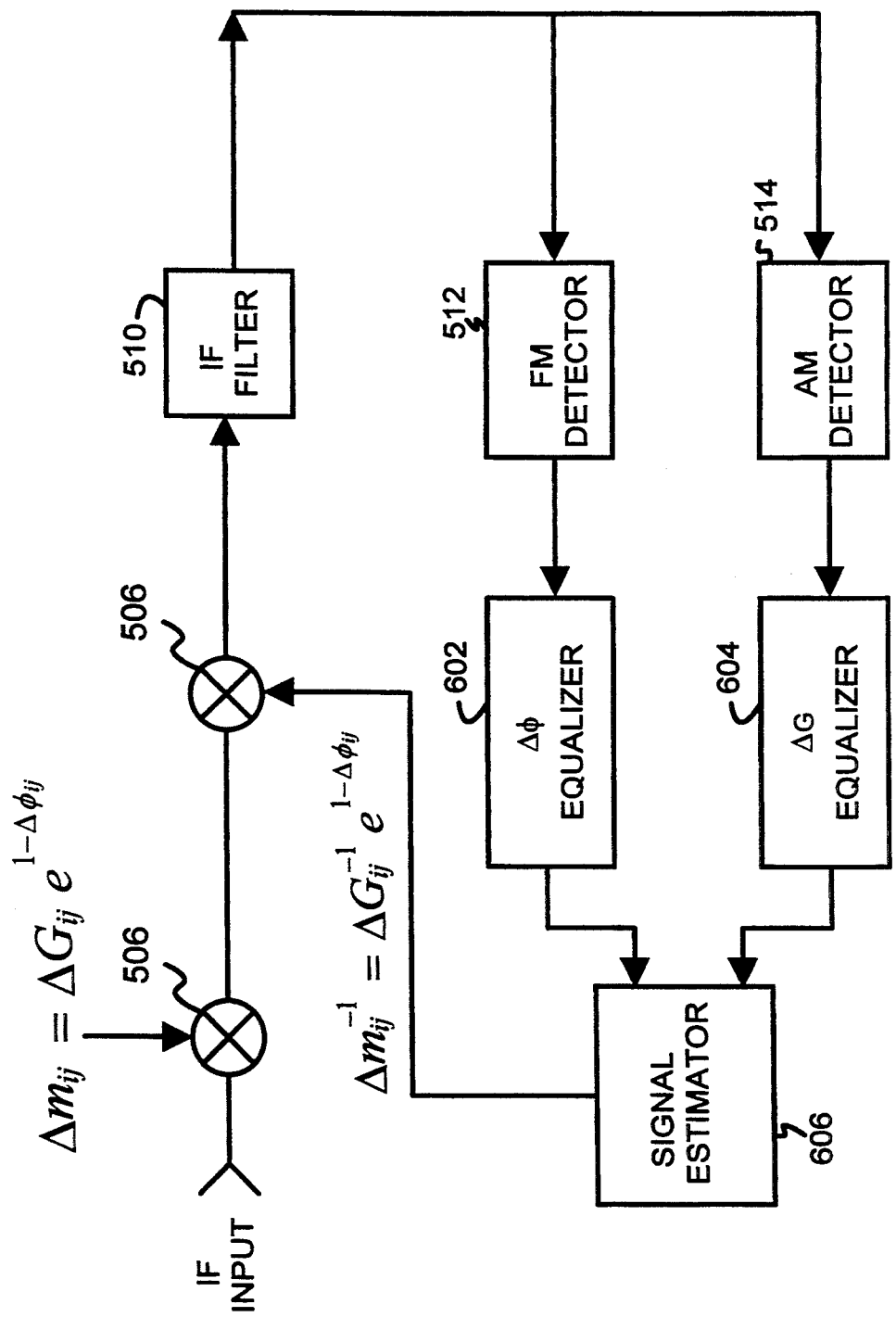
FIG. 4 is a signal flow description of the hardware block diagram of FIG. 3 in accordance with the present invention.

To more fully explain the present invention refer now to FIG. 4. FIGS. 4 shows the signal flow associated with the hardware block diagram of FIG. 3.

As noted before hand, the commutating switch 502 (FIG. 3) imposes amplitude and phase ($\Delta Gij$ and $\Delta \phi ij$) changes on the incoming signal. This modulated signal passes to the vector modulator 506. A signal $\Delta \hat{M}ij^{-1}$ from the feedback loop is multiplied by the signal, $\Delta \hat{M}ij$, from the commutation process. $\Delta \hat{M}ij$ is approximately equal to the reciprocal of $\Delta \hat{M}ij^{-1}$. Hence, the product is approximately unity which corresponds to the nulling out of modulation components from the commutating switch 502.

As noted before, the signal output of the vector modulator 506 is provided to the FM and AM detectors 512 and 514 which generate error signals through equalization components 602 and 604 respectively. The outputs of the equalizers 602 and 604 are provided to the signal estimator 606 which generates the estimate of the switch modulated component $\Delta \hat{M}ij$.

The CPU 520 in a preferred embodiment provides these components through an adaptive processing algorithm which will null out the modulation components of the signal. It is well recognized by one of ordinary skill in the art that this algorithm can be implemented in many ways within CPU 520 and that implementation would be within the spirit and scope of the present invention. To more fully understand such an algorithm refer now to FIGS. 5 and 6.

Figure 5A:
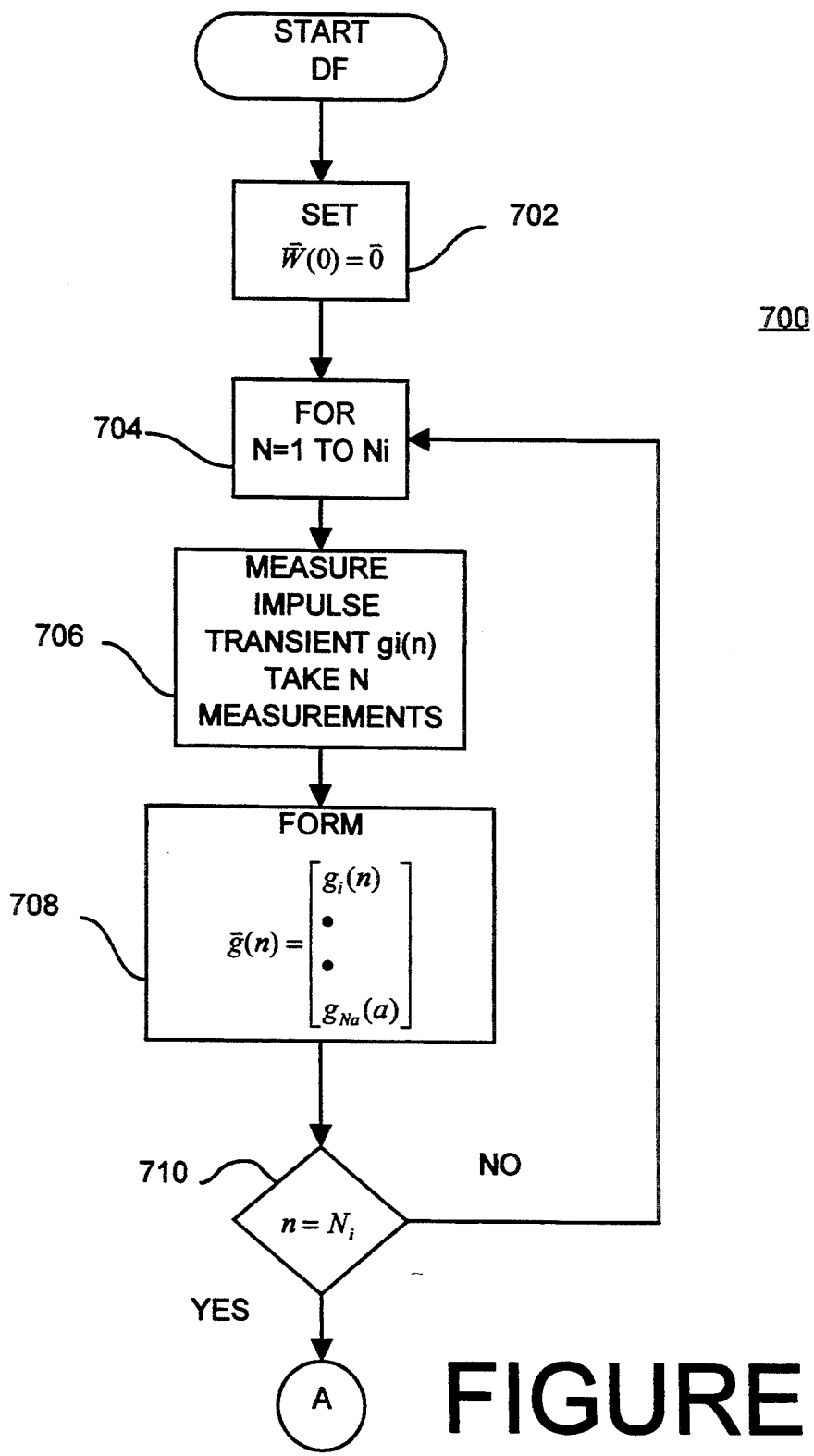
FIGS. 5(a)–5(c) are diagrams that illustrate showing the operation of an adaptive processing algorithm in accordance with the present invention in which the antennas are whips or single dipole antennas.
Figure 5B:
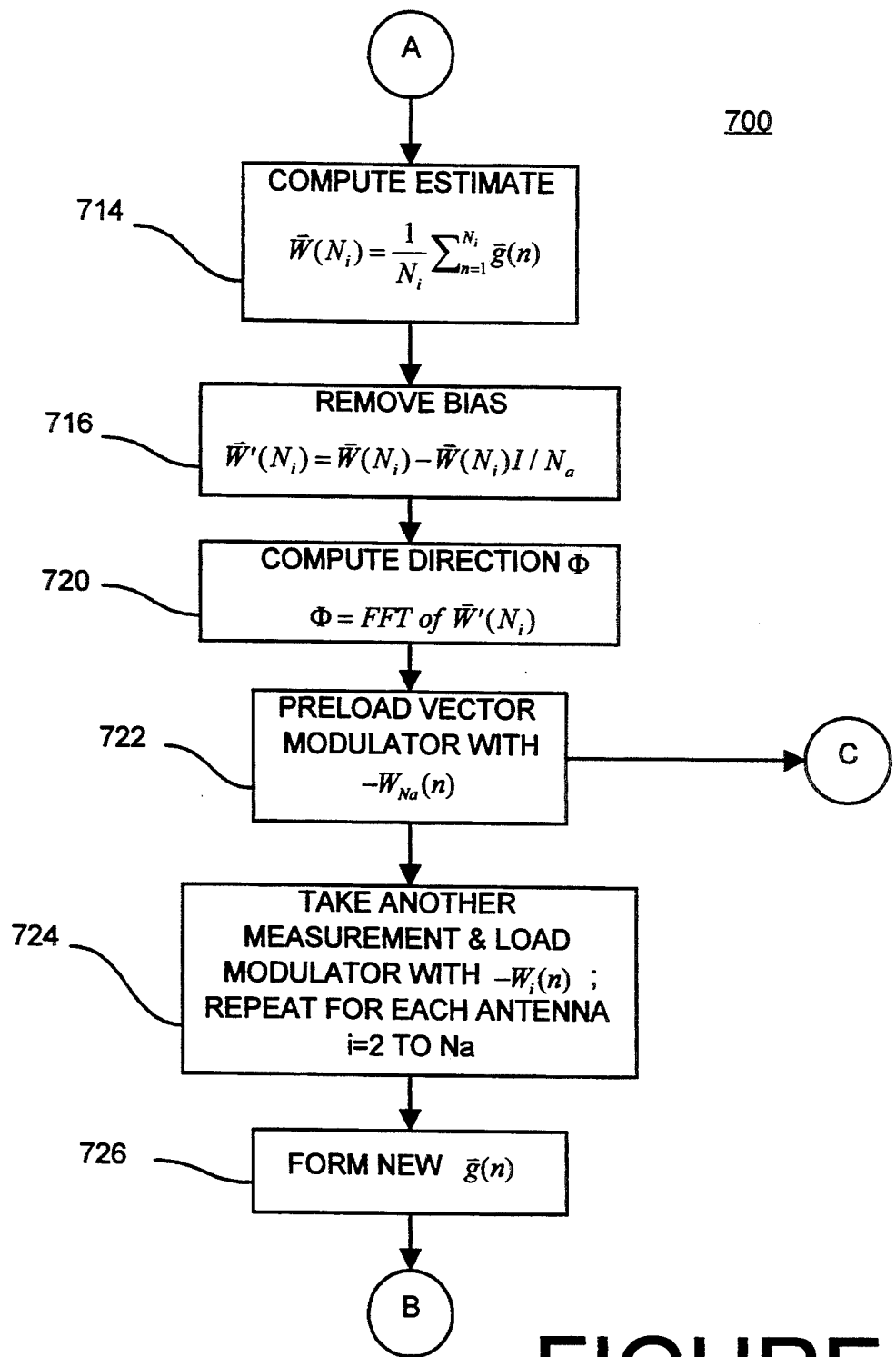
Figure 5C:
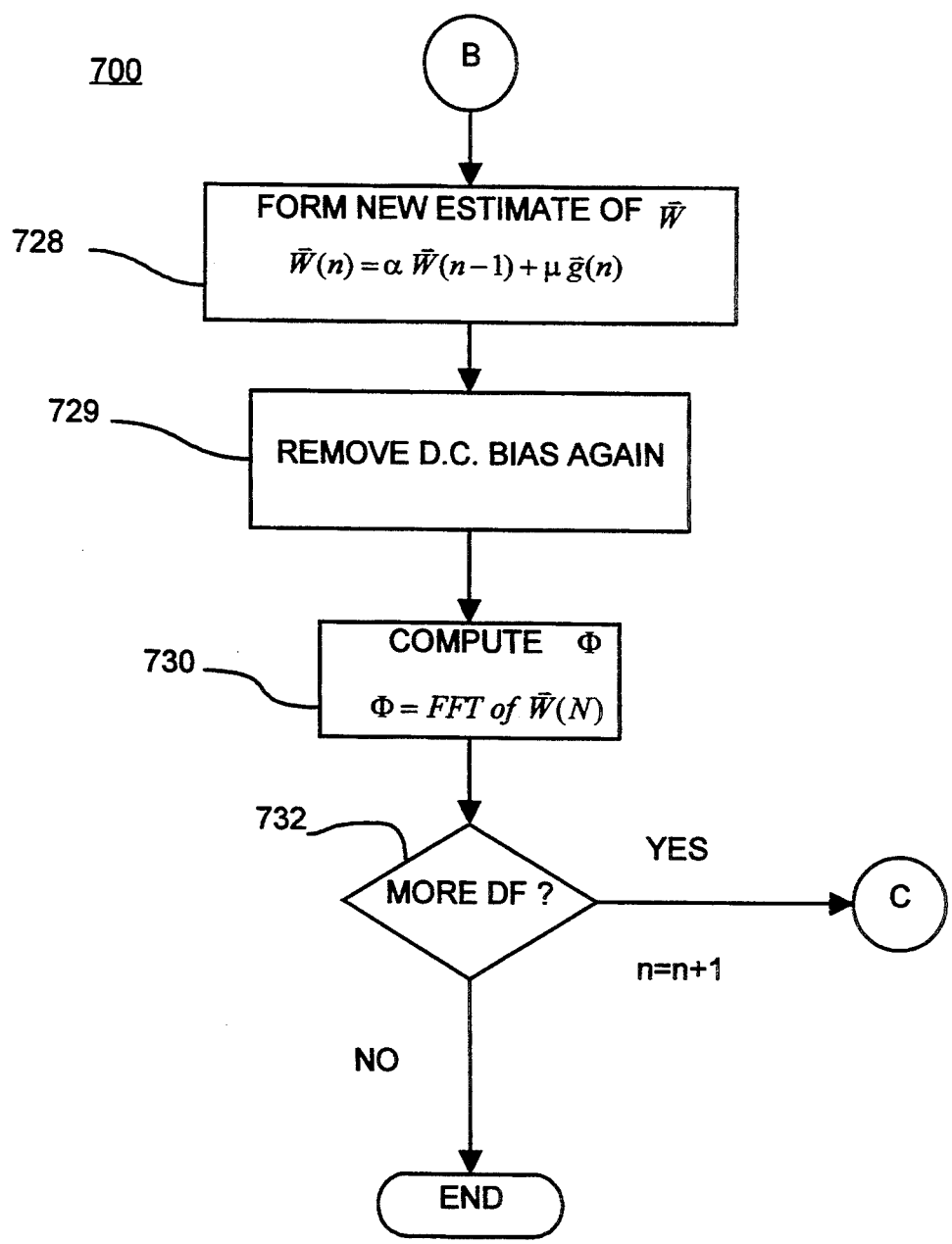

FIG. 5 is a flow chart for the adaptive processing algorithm when the antenna elements are simple elements such as whips or dipoles.

Algorithm (Whip/Vertical Dipole Antennas).

When the DF process is activated, the setting of the antenna elements (W(o)=o) is initialized (block 702). Therefore, the last antenna in the sequence is selected. With the commutating switch sampling the antennas, take $N_i$ initial measurements from $N_a$ antennas (block 704). Note that i represents the $i$th antenna element in a rotation. The measurements correspond to the impulse transients, $g_i(n)$ as the switch moves from one antenna to the next (block 706). The vector of the measurements is:

$$\vec{g}(n) = \begin{bmatrix} g_1(n) \\ g_2(n) \\ \cdot \\ \cdot \\ \cdot \\ g_{N_a}(n) \end{bmatrix}$$

where n is the rotation number (block 708). If $n < N_i$ (block 710) then the steps of blocks 702 through 706 are repeated. If $n = N_i$, then compute an estimate or average of g (n) where the estimate is:

$$W(n) = \frac{1}{N_i} \sum_{n=1}^{N_i} \vec{g}(n) \text{ (block 714)}$$

This computation may include a bias or D.C. offset term. The D.C. offset results from tuning errors. Thereafter the bias term is removed.

The following mathematical expression describes this removal:

$$\vec{W'}(n) = \vec{W}(n) - \vec{W}^T(n) \cdot 1/N_a$$

where $W^T$ (n) is the transpose of W(n) and 1 is the unit vector. (block 716)

From the unbiased term, the direction of arrival, $\phi$, is computed by taking the Fourier Transform of W' (n). (block 720). Note that $\phi$ is the angle of the first sinusoidal component.

Thereafter the vector modulator 506 FIG. 4 is preloaded with $W_{Na}(n)$. The term $W_{Na}$ is the $N_a$th element of the vector W (block 722)

Thereafter another set of measurements is taken:

$$n = n + 1$$

and the vector modulator 506 is loaded with $-W_i(n)$, the ith element, at the same instant the antenna is switched (block 718), and i=1 to $N_a$. As the measurements are made new measurement vector g(n) is formed (block 726).

Thereafter, the previous estimate of W' (n−I) and the new measurement value, g(n), are utilized to estimate a new value of W' (n). Specifically, $$\vec{W}(n) = \alpha \vec{W}(n-1) + \mu \vec{g}(n)$$

which is a form of a leaky integrator. The terms $\alpha$ and $\mu$ are the adaptive coefficients that set the integration and decay time constants (block 728). As above, remove the D.C. bias term again, Using the new estimate of $\overline{W'(n)}$, the direction bearing angle, $\phi$, is computed where $\phi$ is the Fourier Transform of W (block 730).

Finally, steps in blocks 722–732 are repeated until the bearing angle $\phi$ is accurately determined.

Algorithm (Cross Looped Antennas/Horizontal Dipoles)

Figure 6:
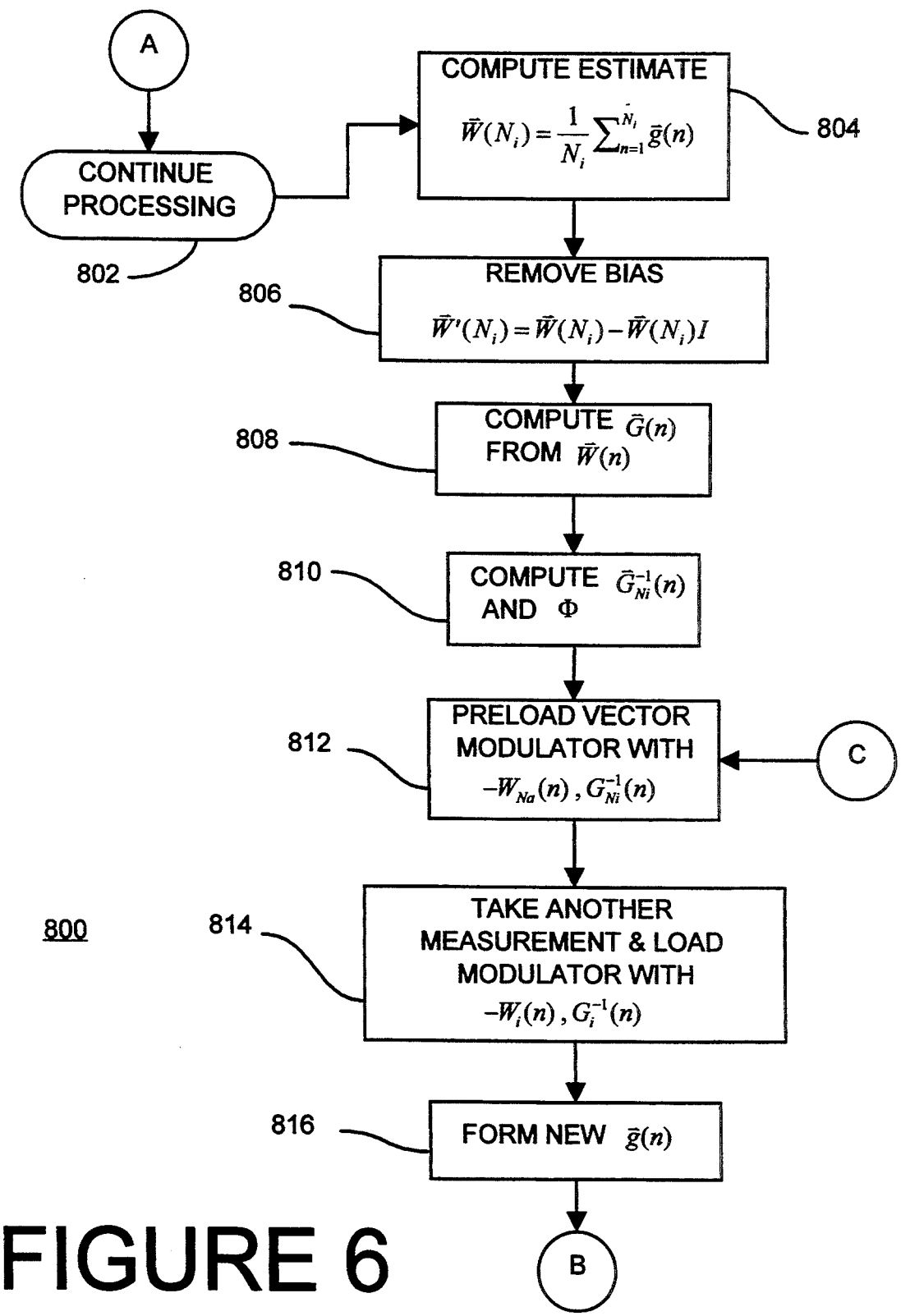
FIG. 6 is a flow chart showing the operation of the adaptive processing algorithm of FIG. 5 in which the antenna elements are cross loop or horizontal dipole antennas.

FIG. 6 is a flow chart showing the algorithm when finding the bearing angle using cross looped antennas or horizontal dipole antennas. Amplitude comparison techniques are typically used in the prior art to derive bearing angles. The algorithm shown in the flow chart of FIG. 6, along with the steps from the flow chart of FIG. 5, allows the determination of bearing angles when using these types of antennas. The following discusses the additional steps necessary to determine the bearing angle when utilizing cross loop or horizontal dipole antennas.

U.S. patent application Ser. No. 07/998,390, now U.S. Pat. No. 5,323,167 assigned to the assignee of the present invention entitled "IMPROVED ANTENNA CONFIGURATION AND SYSTEM FOR DETERMINING THE DIRECTION OF A RADIO FREQUENCY SIGNAL", describes the details of a particular sense and cross loop antenna and horizontal dipole arrangement and is herein incorporated by reference. However, the following discussion has applications for many types of cross loop or horizontal dipole antenna.

Referring back to FIGS. 5 and 6, when sample measurements are made on these types of antennas, phase and amplitude errors occur as the signal switches from one antenna to another. Although an amplitude detector and its corresponding feedback path can be used, a more straight forward approach can be taken that gets around the amplitude measurement. Specifically, for these types of antenna configurations, a unique relationship exists between the amplitude and phase measurements. Making use of the relationship reduces much of the complexity of the computations. To more particularly explain this feature refer now to the following discussion.

It is known that when there are two orthogonal dipoles and one sense antenna, the switching components of these antennas have the form of $$\sin(2\pi ft) + A\cos\phi\cos(2\pi ft)$$

$$\sin(2\pi ft) + A\sin\phi\cos(2\pi ft)$$

$$\sin(2\pi ft) - A\cos\phi\cos(2\pi ft)$$

$$\sin(2\pi ft) - A\sin\phi\cos(2\pi ft)$$

where $\phi$ represents the direction of arrival of the signal of interest and A is an amplitude level of the signal of interest relative to the reference level. These can also be expressed as:

$$\sqrt{1 + A^2\cos^2\phi} \, \cos(2\pi ft - \tan^{-1}(1/A\cos\phi))$$

$$\sqrt{1 + A^2\sin^2\phi} \, \cos(2\pi ft - \tan^{-1}(1/A\sin\phi))$$

$$\sqrt{1 + A^2\cos^2\phi} \, \cos(2\pi ft + \tan^{-1}(1/A\cos\phi))$$

$$\sqrt{1 + A^2\sin^2\phi} \, \cos(2\pi ft + \tan^{-1}(1/A\sin\phi))$$

Hence, with a set of phase measurements we immediately obtain the amplitude levels corresponding to the phase measurements.

As before follow steps 702–710 shown for the above described flow chart of FIG. 5. Using the phase estimates W(n) the corresponding amplitude estimate can be derived. Thus, W(n) provides G(n). (block 808)

But the vector modulator 506 is preloaded with the inverse of the amplitude estimate $G_{Na}^{-1}(n)$. (block 812)

Therefore, in this embodiment only measurements from the FM detector need to be utilized since the phase measurements from the FM detector are used to derive the amplitude measurements.

Then steps of blocks 814–816 are implemented. Thereafter, referring to FIG. 5, blocks 728–732 are repeated until the bearing angle is determined. Therefore, the amplitude measurement is not needed and the computation is greatly simplified.

Although the present invention has been described in accordance with the embodiments shown in the figures, one of ordinary skill in the art would readily recognize that there could be variations to those embodiments and those variations of the present invention. Accordingly, many modifications may be made by one of ordinary skill in the art without departing from the spirit of the present invention, the scope of which is defined solely by the appended claims.

We claim

1. An apparatus for determining the bearing angle of a radio frequency (RF) signal comprising:
    means for commutating between a plurality of RF signal receiving antenna elements to provide a sampled RF signal, the commutating means providing commutation induced phase and amplitude modulation to the RF signal;
    means for modulating the sampled and modulated RF signal to an intermediate frequency (IF) signal, the IF signal including the commutation induced phase and amplitude modulation;
    means for detecting the IF signal;
    means for filtering the IF signal and providing detected frequency modulation (FM), amplitude modulation (AM), single sideband (SSB) and pulsed signals; and
    means responsive to the detecting means for removing the commutation induced phase and amplitude modulation from the IF signal whereby the bearing angle of the RF signal is determined.

2. The apparatus of claim 1 which further comprises:
    means for receiving the IF signal from the converting means and providing an audio output signal representative of the IF signal.

3. The apparatus of claim 1 which further comprises:
    means for detecting the FM signals;
    means for detecting the AM signals;
    means for detecting the SSB signals; and
    means for detecting the pulsed signal.

4. The apparatus of claim 3 which further comprises:

means for converting the FM signal to a first digital signal; and means for converting the AM signal to a second digital signal; the first and second digital signals being provided to the removing means.

5. The apparatus of claim 4 in which the removing means comprises a central processing unit (CPU).

6. The apparatus of claim 5 in which the central processing unit (CPU) responsive to the first and second digital signals for providing amplitude and phase adjustments to null out effects of the modulation caused by the commutating means.

7. The apparatus of claim 1 in which the detecting means detects a change in frequency of the IF signal due to commutation phase and amplitude induced modulation, provides that frequency change to the removing means and the removing means responsive to that frequency change provides the inverse of that frequency change to the modulating means thereby cancelling the commutation induced modulation in the IF signal.

8. An apparatus for determining the bearing angle of a radio frequency (RF) signal comprising:

a switch for commutating between a plurality of RF signal receiving antenna elements to provide a sampled RF signal, the switch providing commutation induced phase and amplitude modulation to the RF signal;

a vector modulation for modulating the sampled and modulated RF signal to an intermediate frequency (IF) signal, the IF signal including the commutation induced modulation;

means for detecting the IF signal;

narrowband filter for filtering the IF signal and providing selected frequency modulation (FM), amplitude modulation (AM), single sideband (SSB) and pulsed signals; and a processor responsive to the detecting means for adaptively removing the commutation induced phase and amplitude modulation from the IF signal whereby the bearing angle of the RF signal is determined.

9. The apparatus of claim 8 which further comprises:

a detector for receiving the IF signal from the converting means and providing an audio output signal representative of the IF signal.

10. The apparatus of claim 8 in which the detector further comprises:

means for detecting the FM signals;
means for detecting the AM signals;
means for detecting the SSB signals; and
means for detecting the pulsed signal.

11. The apparatus of claim 10 which further comprises:

a first analog to digital converter for converting the FM signal to a first digital signal; and a second analog to digital converter for converting the AM signal to a second digital signal; the first and second digital signals being provided to the processor.

12. The apparatus of claim 8 in which the detecting means detect a change in frequency of IF signal due to the commutation phase and amplitude modulation, and provides the change in frequency to the processor.

13. The apparatus of claim 12 in which the processing means provides a signal to the vector modulator which is representative of the inverse of frequency of the commutation induced signal to the vector modulator thereby cancelling the commutation induced modulation.

14. A method for determining the bearing angle of a radio frequency (RF) signal comprising the steps of:

(a) commutating between a plurality of RF signal receiving antenna elements to provide a sampled RF signal, and to provide commutation induced phase and amplitude modulation to the RF signal;

(b) converting the sampled and modulated RF signal to an intermediate frequency (IF) signal, the IF signal including the commutation induced modulation;

(c) detecting the IF signal;

(d) removing the commutation induced phase and amplitude modulation from the IF signal whereby the bearing angle of the RF signal is determined and (e) filtering the IF signal and providing selected frequency modulation (FM), amplitude modulation (AM), single sideband (SSB) and pulsed signals.

15. The method of claim 14 which further comprises the steps of:

(a) receiving the IF signal; and
(b) providing an audio output signal representative of the IF signal.

16. The method of claim 14 which further comprises the steps of:

(a) detecting the FM signals;
(b) detecting the AM signals;
(c) detecting the SSB signals; and
(d) detecting the pulsed signals.

17. The method of claim 16 which further comprises the steps of:

(a) converting the FM signal to a first digital signal; and
(b) converting the AM signal to a second digital signal.

18. A method for adaptively determining the bearing angle of RF signal utilizing a plurality of antenna elements comprising the steps of:

(a) initializing each of the antenna elements;
(b) switching between each of the plurality of antenna elements to sample an output signal from each of the plurality of antenna elements;
(c) measuring the output signal for phase and amplitude from each of the plurality of antenna elements to provide an impulse transient from each of the antenna elements;
(d) computing an average of the measurements from step (c) of the impulse transients from the plurality of antenna elements;
(e) removing a bias term from the average of the measurements; and
(f) computing the bearing angle from the results of steps (a)–(e).

* * * * *